United States Patent Office 2,849,482
Patented Aug. 26, 1958

2,849,482

PRODUCTION OF NAPHTHALENE-2,6-DICARBOXYLIC ACID

Bernhard Raecke, Dusseldorf, Werner Stein, Dusseldorf-Holthausen, and Hubert Schirp, Dusseldorf, Germany, assignors to Henkel & Cie. G. m. b. H., Dusseldorf-Holthausen, Germany, a corporation of Germany No Drawing. Application November 19, 1956
Serial No. 622,812

Claims priority, application Germany November 19, 1955

8 Claims. (Cl. 260—515)

This is a continuation-in-part of application Serial No. 413,948, filed March 3, 1954, now abandoned.

This invention relates to a process of producing naphthalene-2,6-dicarboxylic acid, and more particularly to a process of producing naphthalene-2,6-dicarboxylic acid from naphthalic acid.

It is an object of the present invention to provide a simple and effective process of producing naphthalene-2,6-dicarboxylic acid and its derivatives by using as starting material naphthalic acid which is readily available from the coal tar constituent acenaphthene.

Various other objects and advantages of our invention will become apparent as the description proceeds.

We have discovered that naphthalic acid may be converted into naphthalene-2,6-dicarboxylic acid by forming an alkali metal salt of naphthalic acid, heating the alkali metal salt of naphthalic acid to elevated temperatures, whereby rearrangement of said naphthalic acid salt into the corresponding naphthalene-2,6-dicarboxylic acid salt is effected, and converting the naphthalene-2,6-dicarboxylic acid alkali metal salt into the free acid.

In general, a reaction temperature exceeding 340° C. is required to achieve a speed of reaction sufficiently rapid for industrial purposes and large scale manufacture. The decomposition temperature of the starting material involved determines the upper limit of said reaction temperature. In general, it is preferred not to heat the starting materials to temperatures above 500° C.

According to a very advantageous embodiment of the present invention, the rearrangement reaction is favorably influenced by the presence of catalysts. Working in the presence of a metal, such as zinc or cadmium or compounds of such metals, has produced especially satisfactory results. Especially suitable compounds of said metals are their oxides or their salts with inorganic or organic acids. Lead and lead compounds are other catalysts which can be used with great advantage. The catalysts may be precipitated on suitable carrier materials. The presence of said catalysts considerably accelerates the rearrangement reaction over certain side-reactions which simultaneously take place and cause decomposition. Consequently, the result of said catalytic action is a considerable increase in yield of naphthalene-2,6-dicarboxylic acid salt.

The acceleration of the speed of reaction, furthermore, permits the use of lower reaction temperatures and operation at low pressures, even at atmospheric pressure.

To achieve best yields, the rearrangement reaction is carried out in an inert, substantially oxygen-free atmosphere in order to prevent decomposition. Thus it is of advantage to perform the rearrangement reaction in an autoclave in an atmosphere of such inert gases or vapors as carbon dioxide, nitrogen, the noble gases, methane, ethane, propane, carbon monoxide and benzene vapor at superatmospheric or atmospheric pressure. The autoclave is preferably provided with a stirring device or a rotary autoclave is used. Especially satisfactory results are achieved on heating the naphthalic acid alkali metal salt, preferably admixed with the catalyst, in thin layers distributed on removable inserts composed of vertical partitions and horizontal shelves, respectively spaced from each other at distances of a few centimeters. In this manner efficient heat transfer is achieved.

The presence of water during reaction should be avoided because even small amounts of moisture cause a decrease in yield.

It is not necessary to use pure alkali metal salts of naphthalic acid as starting material. Said salt may be admixed with inert materials, such as sand, coke, pieces of metal, and others. Inert compounds, such as potassium carbonate, potassium sulfate, potassium chloride and diphenyloxide, may also be admixed.

It is not necessary to first prepare the alkali metal salt of naphthalic acid and to use said salt as such; reaction mixtures the components of which react with each other to yield the naphthalic acid alkali metal salt at elevated temperatures may also be used as the starting material. Especially suitable mixtures of this type are mixtures of naphthalic acid anhydride and an alkali metal carbonate.

Free naphthalene-2,6-dicarboxylic acid is obtained from the alkali metal salt formed by the rearrangement reaction according to our invention, by acidifying an aqueous solution of the resulting crude reaction product. It is, of course, also possible to convert the resulting crude alkali metal salt directly into the dichloride or into esters of naphthalene-2,6-dicarboxylic acid in accordance with known methods.

The following examples serve to illustrate the invention without, however, limiting the same thereto:

*Example I*

56 g. of anhydrous potassium carbonate and 80 g. of naphthalic acid anhydride were heated in an autoclave provided with stirrer to 390° C. for 6 hours. Before heating carbon dioxide was introduced into the autoclave until the internal pressure reached 50 atmospheres gauge. 108 g. of crude rearrangement reaction product obtained on cooling were pulverized and extracted with 400 cc. of boiling water. The resulting solution was filtered and free naphthalene-2,6-dicarboxylic acid was precipitated from the filtered aqueous solution by the addition of hydrochloric acid in an amount sufficient to render the solution strongly acid. The precipitated free acid was filtered off by suction and was purified by boiling three times each with 400 cc. of water. The yield of naphthalene-2,6-dicarboxylic acid purified in this manner was 23.3 g., corresponding to 27% of the theoretical yield. The naphthalene-2,6-dicarboxylic acid thus obtained was converted according to known methods into its dichloride, dimethyl ester and diamide. The dichloride had a melting point of 186° C. to 187° C.; the dimethyl ester had a melting point of 183° C. to 184° C.; and the diamide had a melting point of 360° C. (with sublimation).

*Example II*

A mixture of 180 g. of naphthalic acid anhydride, 130 g. of anhydrous potassium carbonate, and 20 g. of cadmium oxide was heated in a rotary autoclave, made of steel and containing loose porcelain balls, in an atmosphere of carbon dioxide at a constant pressure of 10 atmospheres gauge to 425° C. for 4 hours. The crude rearrangement reaction product obtained on cooling was pulverized and extracted with 900 cc. of boiling water. The resulting aqueous solution was filtered and free naphthalene-2,6-dicarboxylic acid was precipitated therefrom by the addition of hydrochloric acid in an amount sufficient to render said solution strongly acid. The precipitated acid was filtered off by suction and was purified by repeated boiling with water. The yield of naphthalene-2,6-dicarboxylic acid purified in this manner was 30.4% of the theoretical yield.

Example III 30 g. of the disodium salt of naphthalic acid were admixed with 1 g. cadmium fluoride in a porcelain ball mill and the resulting mixture was heated for 2 hours at 425° C. in a rotary autoclave having a net volume of 0.2 liters. Prior to heating, carbon dioxide was introduced into the autoclave until the internal pressure reached 50 atmospheres. The pressure at 425° C. was 170 atmospheres. The raw reaction products, which weighed 30 g., was dissolved in water, the solution was filtered and the clear filtrate was acidified with hydrochloric acid at about 90° C. The precipitate formed thereby was filtered off while the solution was still hot, and the filter cake was washed three times with 250 cc. portions of warm ethanol. Naphthalene-2,6-dicarboxylic acid, which is insoluble in ethanol, was obtained in an amount of 0.9 g., corresponding to 3.6% of the theoretical yield.

Example IV 58.4 g. of the dipotassium salt of naphthalic acid (0.2 mol) were admixed with 3 g. anhydrous cadmium chloride in a porcelain ball mill and the resulting mixture was heated for 1 hour at 430° C. in a horizontal electrically heated stationary furnace. During that time, carbon dioxide was passed through the furnace at atmospheric pressure. The raw reaction product thus obtained weighed 52.1 g. and was worked up as described in the previous examples. The precipitated naphthalene-2,6-dicarboxylic acid was boiled twice in 200 cc. portions of ethanol. The amount of naphthalene-2,6-dicarboxylic acid obtained in this manner was 9.9 g., which corresponds to 22.9% of the theoretical yield. The wash alcohol and the mother liquor which was extracted with ether yielded 5.9 g. of a mixture of naphthalene monocarboxylic and tricarboxylic acids.

Example V 58.4 g. of the dipotassium salt of naphthalic acid (0.2 mol) were admixed with 3.0 g. anhydrous zinc chloride in a porcelain ball mill and the resulting mixture was heated for 1 hour at 430° C. in a furnace and under the conditions described in Example IV. The raw reaction product, which weighed 48.2 g., was worked up as previously described and yielded 5.2 g. naphthalene-2,6-dicarboxylic acid, which corresponds to 12.0% of the theoretical yield.

Example VI

A mixture of 58.4 g. of the dipotassium salt of naphthalic acid (0.2 mol) and 5 g. zinc power was heated for 1 hour at 430° C. in an electrically heated autoclave without agitation of the reaction mixture. Prior to heating, carbon dioxide was introduced into the autoclave until the internal pressure reached 10 atmospheres, and this pressure was maintained throughout the heating step by periodically opening the off-take valve of the autoclave. The raw reaction product, which weighed 58.6 g., was worked up as previously described and yielded 8.8 g. naphthalene-2,6-dicarboxylic acid, which corresponds to 20.4% of the theoretical yield. Alcoholic and aqueous filtrates and liquors yielded 10.9 g. of a mixture of naphthalene monocarboxylic, dicarboxylic and tricarboxylic acids.

Example VII 88 g. of the purified dipotassium salt of naphthalic acid and 4 g. cadmium fluoride were intimately admixed with each other and the resulting mixture was placed into a rotary autoclave having a net volume of 200 cc. The air in the autoclave was then displaced with argon. Thereafter additional argon was introduced into the closed autoclave until the internal pressure reached 50 atmospheres. The autoclave and its contents were subsequently heated for 4 hours at 430° C. After cooling and releasing the internal pressure, the raw reaction product was dissolved in hot water. The resulting solution was purified with activated charcoal and filtered. The filtrate was then acidified with hydrochloric acid at about 90° C. The naphthalene-2,6-dicarboxylic acid precipitated thereby was filtered off while the solution was still hot, and the filter cake was washed 3 times with 125 cc. portions of warm ethanol. The yield of purified naphthalene-2,6-dicarboxylic acid was 35 g.

Example VIII

A mixture of 40 g. of the dipotassium salt of naphthalic acid and 3 g. cadmium fluoride was heated for 30 minutes at 430° C. in a rotary autoclave having a net volume of 200 cc. Prior to heating, carbon monoxide was introduced into the autoclave until the internal pressure reached 50 atmospheres. The maximum pressure at 430° C. was 130 atmospheres. The raw reaction product was worked up as described in the previous examples and yielded 8.6 g. naphthalene-2,6-dicarboxylic acid.

Example IX 166 g. of the dipotassium salt of naphthalic acid purified by reprecipitation from methanol, and 10 g. cadmium fluoride were placed into an autoclave made of high-quality steel and provided with a stirrer, and nitrogen was introduced into the autoclave until the internal pressure reached 60 atmospheres gauge. Thereafter the autoclave was heated for 4 hours at 425° C. After cooling, the raw product formed thereby was pulverized and dissolved in hot water. The solution was purified with activated charcoal, filtered, and the naphthalene-2,6-dicarboxylic acid was precipitated with hydrochloric acid at 85° C. The precipitated organic acid was separated by vacuum filtration after the solution had been allowed to cool, and the precipitate was purified by repeated extraction with boiling water and washing with alcohol. The yield of purified naphthalene-2,6-dicarboxylic acid was 77 g.

Substantially the same yields were obtained when zinc oxide, lead oxide, metallic lead or metallic cadmium were used as the catalyst in place of the particular catalyst in the above examples. Metal oxides, when used as catalysts, have, in general, a favorable effect on the rearrangement reaction. The amount of catalyst used is preferably about 2 to 7% by weight of the alkali metal naphthalic acid salt.

Similarly, virtually identical results were obtained when methane, ethane, propane, benzene vapor or a noble gas other than argon was substituted for the inert gas in the particular examples.

Finally, the cesium, rubidium and lithium salts of naphthalic acid also underwent rearrangement into the corresponding naphthalene-2,6-dicarboxylic acid salts upon heating them under the conditions illustrated in the above examples, although the yields of naphthalene-2,6-dicarboxylic acid were not quite as high as when the potassium salts were used as the starting material.

Many other changes and variations in the proportions of the reaction components, the nature and amounts of catalysts added, the reaction temperature, duration, and pressure, the apparatus used for carrying out the reaction, the methods of working up the reaction mixture and of isolating and recovering therefrom naphthalene-2,6-dicarboxylic acid, the methods of purifying said acid and the like may be made by those skilled in the art in accordance with the principles set forth herein and in the appended claims.

We claim:

1. The process of producing dialkali metal salts of naphthalene-2,6-dicarboxylic acid, which comprises heating a material selected from the group consisting of dialkali metal salts of naphthalic acid and mixtures consisting of naphthalic acid anhydride and an alkali metal carbonate, said mixtures forming dialkali metal salts of naphthalic acid at the reaction temperature, in a substantially oxygen-free, substantially anhydrous inert atmosphere to a temperature between about 340° C. and the temperature at which the starting materials and reaction products begin to decompose, until a substantial amount of the starting material has been transformed into the corresponding dialkali metal salt of naphthalene-2,6-dicarboxylic acid.

2. The process of producing dialkali metal salts of naphthalene-2,6-dicarboxylic acid, which comprises heating a material selected from the group consisting of dialkali metal salts of naphthalic acid and mixtures consisting of naphthalic acid anhydride and an alkali metal carbonate, said mixtures forming dialkali metal salts of naphthalic acid at the reaction temperature, in a substantially oxygen-free, substantially anhydrous inert atmosphere and in the presence of a catalyst containing a metal selected from the group consisting of cadmium, zinc and lead, to a temperature between about 340° C. and the temperature at which the starting materials and reaction products begin to decompose, until a substantial amount of the starting material has been transformed into the corresponding dialkali metal salt of naphthalene-2,6-dicarboxylic acid.

3. The process of producing dialkali metal salts of naphthalene-2,6-dicarboxylic acid, which comprises heating a dialkali metal salt of naphthalic acid in a substantially oxygen-free, a substantially anhydrous inert atmosphere to a temperature between about 340° C. and the temperature at which the starting materials and reaction products begin to decompose until a substantial amount of said dialkali metal salt of naphthalic acid has been transformed into the corresponding dialkali metal salt of naphthalene-2,6-dicarboxylic acid.

4. The process of producing dialkali metal salts of naphthalene-2,6-dicarboxylic acid, which comprises heating a dialkali metal salt of naphthalic acid in a substantially oxygen-free, a substantially anhydrous inert atmosphere and in the presence of a catalyst containing a metal selected from the group consisting of cadmium, zinc and lead, to a temperature between about 340° C. and the temperature at which the starting materials and the reaction products begin to decompose until a substantial amount of said dialkali metal salt of naphthalic acid has been transformed into the corresponding dialkali metal salt of naphthalene-2,6-dicarboxylic acid.

5. The process of producing naphthalene-2,6-dicarboxylic acid, which comprises heating a material selected from the group consisting of dialkali metal salts of naphthalic acid and mixtures consisting of naphthalic acid anhydride and an alkali metal carbonate, said mixtures forming dialkali metal salts of naphthalic acid at the reaction temperature, in a substantially oxygen-free, substantially anhydrous inert atmosphere to a temperature between about 340° C. and the temperature at which the starting materials and the reaction products begin to decompose until a substantial amount of said starting material has been transformed into the corresponding dialkali metal salt of naphthalene-2,6-dicarboxylic acid, and converting the naphthalene-2,6-dicarboxylic acid salt into free naphthalene-2,6-dicarboxylic acid by acidification.

6. The process of producing naphthalene-2,6-dicarboxylic acid, which comprises heating a material selected from the group consisting of dialkali metal salts of naphthalic acid and mixtures consisting of naphthalic acid anhydride and an alkali metal carbonate, said mixtures forming dialkali metal salts of naphthalic acid at the reaction temperature, in a substantially oxygen-free, substantially anhydrous inert atmosphere and in the presence of a catalyst containing a metal selected from the group consisting of cadmium, zinc and lead, to a temperature between about 340° C. and the temperature at which the starting materials and the reaction products begin to decompose until a substantial amount of said starting material has been transformed into the corresponding dialkali metal salt of naphthalene-2,6-dicarboxylic acid, and converting the naphthalene-2,6-dicarboxylic acid salt into free naphthalene-2,6-dicarboxylic acid by acidification.

7. The process of producing naphthalene-2,6-dicarboxylic acid, which comprises heating a dialkali metal salt of naphthalic acid in a substantially oxygen-free, a substantially anhydrous inert atmosphere to a temperature between about 340° C. and the temperature at which the starting materials and the reaction products begin to decompose until a substantial amount of said dialkali metal salt has been transformed into the corresponding dialkali metal salt of naphthalene-2,6-dicarboxylic acid, and converting the naphthalene-2,6-dicarboxylic acid salt into free naphthalene-2,6-dicarboxylic acid by acidification.

8. The process of producing naphthalene-2,6-dicarboxylic acid, which comprises heating a dialkali metal salt of naphthalic acid in a substantially oxygen-free, a substantially anhydrous inert atmosphere and in the presence of a catalyst containing a metal selected from the group consisting of cadmium, zinc and lead, to a temperature between about 340° C. and the temperature at which the starting materials and the reaction products begin to decompose until a substantial amount of said dialkali metal salt has been transformed into the corresponding dialkali metal salt of naphthalene-2,6-dicarboxylic acid, and converting the naphthalene-2,6-dicarboxylic acid salt into free naphthalene-2,6-dicarboxylic acid by acidification.

No references cited.